United States Patent
Araki

(12) 
(10) Patent No.: US 6,256,169 B1
(45) Date of Patent: Jul. 3, 2001

(54) OPERATION MODE DETECTION DEVICE OF MAGNETIC RECORDING AND REPRODUCING APPARATUS

(75) Inventor: Kazutoshi Araki, Saitama-ken (JP)

(73) Assignee: Toshiba Video Products Japan Co., Ltd., Tokyo (JP)

(*) Notice: Subject to any disclaimer, the term of this patent is extended or adjusted under 35 U.S.C. 154(b) by 0 days.

(21) Appl. No.: 09/457,402

(22) Filed: Dec. 9, 1999

(30) Foreign Application Priority Data

Dec. 9, 1998 (JP) .................................................. 10-350287

(51) Int. Cl.$^7$ ................................................. G11B 15/093
(52) U.S. Cl. ............................................. 360/137; 360/85
(58) Field of Search .................................. 360/84, 85, 95, 360/137; 200/24, 28, 242, 253

(56) References Cited

U.S. PATENT DOCUMENTS

| | | | |
|---|---|---|---|
| 3,731,032 | * | 5/1973 | Schantz ................................. 200/535 |
| 3,819,894 | * | 6/1974 | Flumingnan et al. ................ 200/533 |
| 3,858,021 | * | 12/1974 | Brandlein ........................... 200/277.1 |
| 3,927,288 | * | 12/1975 | Utken et al. .......................... 200/277 |
| 4,072,834 | * | 2/1978 | Godfrey ............................. 200/16 C |
| 4,137,440 | * | 1/1979 | Bryant ................................ 200/159 R |
| 5,180,117 | * | 1/1993 | Katohno et al. ................... 242/334.6 |
| 5,194,999 | * | 3/1993 | Nakajima et al. ..................... 360/69 |

FOREIGN PATENT DOCUMENTS

| | | |
|---|---|---|
| 0 105 817 A1 | * 4/1984 | (EP) . |
| 0 689 215 A1 | * 12/1995 | (EP) . |
| 1-253132 | * 10/1989 | (JP) . |

\* cited by examiner

*Primary Examiner*—William Klimowicz
(74) *Attorney, Agent, or Firm*—Pillsbury Winthrop LLP

(57) ABSTRACT

By providing dummy on projections 61a' to 61d' to cause dummy on status of the switches 62a to 62d at particular positions on the movale contact member pressure projections 61a and 61d in the rotor section 57 which turns on and off a plurality of switches 62a to 62d of the piano-touch type switch corresponding to the operation mode of the VTR, an operation mode detection device 56 which can clean the switch contact surfaces 62a" to 62d" by dummy on operation of the switches 62a to 62d using the dummy on projections 61a' to 61d' when the VTR proceeds from the standby status or the PLAY/REC mode to a next operation mode can be achieved. Thus, even when the piano-touch type switch is used for operation mode detection of the VTR, the switch contact members in the switches 62a to 62d are protected from reaction with substances in the air during the VTR is in standby status. This solves the problem of generating errors in operation mode detection and control resulting from noises generated during ON/OFF operation of the switches 62a to 62d due to sulfurization, oxidation or dust contamination caused by such reaction.

5 Claims, 7 Drawing Sheets

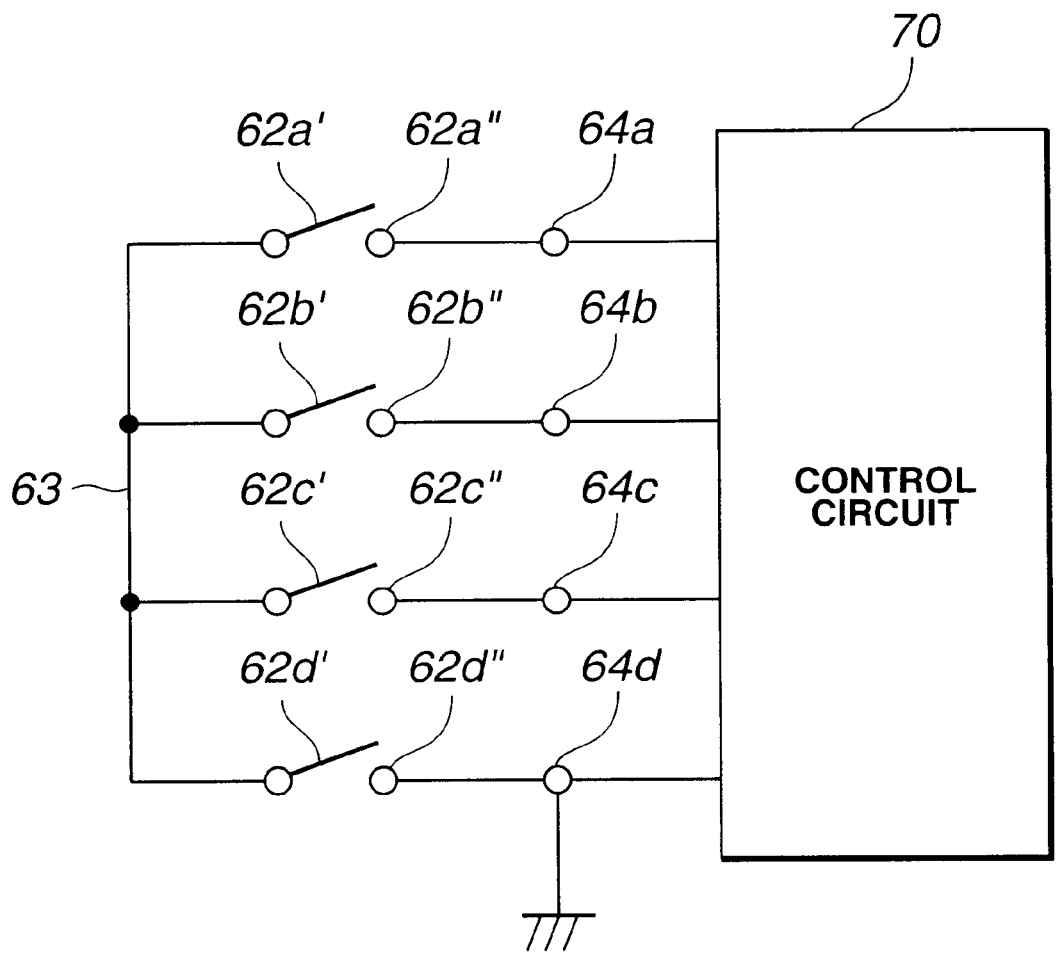

OPERATION MODE DETECTION DEVICE OF MAGNETIC RECORDING AND REPRODUCING APPARATUS

BACKGROUND OF THE INVENTION

1. Field of the Invention

The present invention relates to an operation mode detection device to detect the operation mode position in the driving mechanism which drives and controls the tape cassette loading and the tape running statuses, such as recording, playing, fast forwarding, rewinding and stop of the magnetic tape in the magnetic recording and reproducing apparatus, and particularly, to a switch structure which enables cleaning of the contact members in the piano-touch type switch used as the operation mode detection device.

2. Description of the Related Art

A magnetic recording and reproducing apparatus (hereinafter referred to as "VTR (Video Tape Recorder)") carries a tape cassette into the VTR, guides the magnetic tape in the tape cassette to a certain tape running mechanism and the circumference of a cylinder incorporating a rotary head and, according to various operations input from the input means of the VTR, runs the magnetic tape corresponding to the recording, playing, fast forwarding, rewinding or stop mode.

The VTR mechanism which arranges the tape cassette carrying and the magnetic tape running mode is described below with referring to the plan view of FIG. 4 showing a magnetic tape driving mechanism of the VTR. FIG. 4 shows the magnetic tape driving mechanism laid out on the back of the VTR chassis only. The driving mechanism comprises a plurality of mechanism members 31 to 55.

In the figure, on the right side of a chassis 31 in which the magnetic tape driving mechanism of the VTR is placed, an electric motor 32 serving as the driving source is provided. The electric motor 32 is controlled by the operation mode setting means (not shown) for its revolution speed, number of revolutions and revolution direction. Mounted and fixed to the rotational axis of the electric motor 32 is a worm gear 33, which makes rotations coaxially with the rotational axis of the electric motor 32. A first gear 34 is engaged with the worm gear 33. The first gear 34 consists of a large diameter gear 34a engaged with the worm gear 33 above and a small diameter gear 34b coaxial with the large diameter gear 34a. Engaged with the small diameter gear 34b of the first gear 34 is a second gear 35. A bevel gear (not shown) is formed on the flat surface of the second gear 35. Engaged with the bevel gear on the second gear 35 is a large diameter gear 36a of a third gear 36. The third gear 36 comprises the large diameter gear 36a and a small diameter gear 36b coaxial with it. Engaged with the small diameter gear 36b of the third gear 36 is a large diameter gear 37a of a detection gear 37. The detection gear 37 comprises the large diameter gear 37a and a small diameter gear 37b coaxial with it. The small diameter gear 37b of the detection gear 37 is configured as a pinion and is engaged with a first rack 39 linearly formed at an end of a slider 38.

In other words, the rotational driving of the electric motor 32 is reduced by the worm gear 33, the first gear 34, the second gear 35, the third gear 36 and the detection gear 37 and transmitted to the first rack 39 and slides the slider 38 in the horizontal direction shown with an arrow in the figure.

Formed on the slider 38 are a sliding guide groove 40 to guide the linear sliding in the horizontal direction, a first guide groove 41, a second guide groove 42, and a third guide groove 43. With the guide grooves 40 to 43, guide posts 40' to 43' are mated allowing sliding. The guide post 40' is fixed to the chassis 31. Though details are not shown for the remaining guide posts 41' to 43', the guide post 41', for example is provided with a pinch roller driving lever. When the slider 38 makes sliding operation, the pinch roller driving lever is moved corresponding to the shape of the first guide groove 41 so that the magnetic tape is held between the rotational axis (capstan) of a capstan motor 52 to be described later and the pinch roller so that it can run. Further, the guide post 42' of the second guide groove 42, for example, drives a reel base brake (not shown) and the guide post 43' of the third guide groove 43 is, for example, a driving post to drive the tension lever for tape tension adjustment. The guide grooves 41 to 43 and the guide posts 41' to 43' are not limited to the above functions and they may have other functions. The second gear 35 also works to drive the cassette transfer mechanism for driving the cassette frame on which a tape cassette is placed (not shown) between the tape cassette load/unload position and the reel base position provided on the chassis 31.

At the other end of the slider 38, a second linearly formed rack 44 is provided. A small diameter gear 45a configured as a pinion to be engaged with the second rack 44 and a fourth gear 45 having a large diameter gear 45b coaxial with the small diameter gear 45a are also laid out there. Engaged with the large diameter gear 45b of the fourth gear 45 is a loading gear 46a, with which the other loading gear 46b is engaged. To the rotational axes of the loading gears 46a and 46b, fixed arms 47a and 47b are mounted and fixed so that the fixed arms 47a and 47b make rotations in the circumferential direction together with the rotations of the loading gears 46a and 46b. At the ends of the fixed arms 47a and 47b, an end of a swing arm 48a and an end of a swing arm 48b are rotatably mounted respectively. On the other ends of the swing arms 48a and 48b, magnetic tape pull-out poles 49a and 49b are planted toward the surface of the chassis 31 (toward the back of the figure) respectively. These magnetic tape pull-out poles 49a and 49b make sliding guided by loading guide grooves 50a and 50b formed on the chassis 31. Placed at the center of the loading guide grooves 50a and 50b, a cylinder 51 on which the magnetic tape is to be wound.

In other words, when the electric motor 32 makes rotations for driving and slides the slider 38, the fourth gear 45 engaged with the second rack 44 makes rotations and the loading gear 46a engaged with the fourth gear 45 makes rotations clockwise in the figure, and the loading gear 46b engaged with the loading gear 46a makes rotations counterclockwise in the figure. This causes the fixed arms 47a and 47b to make rotations clockwise and counterclockwise. The rotations of these fixed arms 47a and 47b lead the magnetic tape pull-out poles 49a and 49b at the end of the swing arms 48a and 48b to make sliding guided by the loading guide grooves 50a and 50b. In this procedure, the magnetic tape of the tape cassette (not shown) is pulled out by the magnetic tape pull-out poles 49a and 49b and wound on the cylinder 51.

Reference numeral 52 in FIG. 4 indicates a capstan motor, whose revolution speed, number of revolutions and revolution direction are controlled by operation mode setting means (not shown). This is the driving source which drives the magnetic tape to run and drives the reel base of the tape cassette to make rotations. A small diameter belt pulley 53 is fixed to the rotational axis of the capstan motor 52 and a belt 54 is stretched on the belt pulley 53. The rotational driving of the capstan motor 52 is transmitted to a reel base driving belt pulley 55 by the belt 54. The reel base driving belt pulley 55 provides the rotational driving to either the tape feeding reel base or the tape winding reel base of the tape cassette (not shown) corresponding to the operation mode.

In short, when the magnetic tape driving mechanism of FIG. 4 carries and puts the tape cassette to the certain position on the chassis 31, the rotational driving of the electric motor 32 causes the second gear 35 to make rotations, which drives the tape cassette transfer mechanism (not shown). Thus, the cassette is placed onto the reel base, the magnetic tape is pulled out by the loading poles 49a and 49b from the tape cassette placed on the reel base and wound onto the cylinder 51. Further, the rotational driving of the electric motor 32 slides the slider 38 so as to adjust the speed of the running tape and stop the tape by driving the reel base brake to brake the reel base by the second guide groove 42 and the guide post 42', to press the pinch roller against the capstan by driving the pinch roller driving lever with the first guide groove 41 and the first guide post 41', or to drive the tension lever (not shown) using the third guide groove 43 and the third guide post 43', so that various operation modes of the VTR can be set.

Thus, the currently set operation mode can be learned by detecting the sliding position of the slider 38. Further, when this operation mode changes to a next operation mode, the required sliding amount and traveling direction of the slider 38 (Number of revolutions and revolution direction of the electric motor 32) can be learned. To detect the operation mode position where the slider 38 currently is, the rotations of the electric motor 32 are transmitted, via the first to third gears 34 to 36, to the detection gear 37, which slides the slider 38, and the rotation position of the detection gear 37 can be detected by a device 56 provided on the detection gear 37.

Referring to FIG. 5, the configuration of the device 56 is described below. FIG. 5 shows the outline of the detection gear 37 and the device 56.

The surface of the large diameter gear 37a in the detection gear 37 is provided with a circumferential groove 37d around a rotational axis 37c and a circular hole 37e is formed to the flat plane at the outer periphery of the circumferential groove 37d.

On the other hand, the device 56 comprises a rotor section 57, a stator section 58 and a terminal section 59 connected to the stator section 58. Projected at the center of the surface on the rotor section 57 is, a cylinder 57a to be mated with the rotational axis 37c of the detection gear 37. The rotor section 57 is further provided on its surface with a pillar 57b at the position corresponding to the hole 37e of the detection gear 37 so that the pillar 57b can be inserted into the hole 37e.

Specifically, when the central cylinder 57a of the rotor section 57 is mated with the rotational axis 37c of the detection gear 37 and the pillar 57b of the rotor section 57 is inserted into the circular hole 37e of the detection gear 37, the rotor section 57 makes rotations together with the rotations of the detection gear 37.

Next, referring to FIG. 6, detailed configuration of the device 56 is described. FIG. 6(*a*) is a perspective view showing the surface of the rotor section 57, FIG. 6(*b*) is a perspective view showing the back (inside) of the rotor section 57 and FIG. 6(*c*) is a perspective view showing the back (inside) of the stator section 58 and the terminal section 59.

As shown in FIGS. 6(*a*) and 6(*b*), the rotor section 57 is provided with a disc-shaped projection section 57c on its outer periphery. Further, as shown in FIG. 6(*b*), the central cylinder 57a extended from the surface is formed on the back (inside) of the rotor section 57 and a plurality of movable contact member pressure projections 61a to 61d to be pressed against a plurality of switches 62a to 62d laid out on the stator section 58 (to be described later) is formed on circumferences with different diameters around the central cylinder 57a. The movable contact member pressure projections 61a to 61d are positioned so that, when the rotor section 57 makes a rotation together with the rotation of the detection gear 37, they can turn on and off the switches 62a to 62d of the stator section 58 corresponding to the angle of such rotation.

Referring next to FIG. 6(*c*), the stator section 58 and the terminal section 59 are described. Planted at the center of the stator section 58 is a central axis 5a, with which the central cylinder 57a of the rotor section 57 is to be mated. On the plane around the central axis 58a, four switches 62a, 62b, 62c and 62d are laid out at positions in different distances from the central axis 5a.

The switches 62a to 62d comprise movable contact members 62a' to 62d' and fixed contact members 62a" to 62d" respectively. The movable contact members 62a' to 62d' are commonly connected with a common connection conductor 63 and at the same time fixed to the plane on the inside of the stator section 58. The fixed contact members 62a" to 62d" of the switches 62a to 62d are, via the conductors led to the terminal section 59, connected to the connection terminals 64a to 64d and further connected to the control circuit (with reference numeral 70 in FIG. 7) for operation mode detection.

FIG. 7 shows an example of the circuit configuration for the device 56 in FIGS. 6(*a*) to 6(*c*). Among the connection terminals 64a to 64d of the terminal section 59, the terminals 64a to 64c are detection terminals to detect ON or OFF of the switches 62a to 62c and the terminal 64d is a common terminal (grounding terminal) and is connected to the reference potential (to the chassis 31 shown in FIG. 4). The movable contact member for detection terminal 62a' and the fixed contact member for detection terminal 62a" constitute the switch 62a and the movable contact member for detection terminal 62b' and the fixed contact member for detection terminal 62b" constitute the switch 62b, the movable contact member for detection terminal 62c' and the fixed contact member for detection terminal 62c" constitute the switch 62c and the movable contact member for common terminal 62d' and the fixed contact member for common terminal 62d" constitute the switch 62d. The movable contact members 62a' to 62d' are commonly connected by the conductor 63. The fixed contact members 62a" to 62d" are, via the connection terminals 64a to 64d respectively, connected to the control circuit 70, which comprises a microcomputer, for example. As understood from the connection configuration of FIG. 7, the control circuit 70 can detect various operation modes by turning on of at least one of the switches 62a to 62c with the switch 62d turned on, i.e. by combination of the low level of the switch 62d and the low level of at least one of the switches 62a to 62c.

Further, referring to FIGS. 6(*a*) to 6(*c*), in order to fix the rotor section 57 rotatably to the stator section 58 after the central cylinder 57a of the rotor section 57 is mated with the central axis 58a of the stator section 58, the stator section 58 is provided with projections 65a to 65c on its outer periphery. The projections 65a to 65c are further provided with fixing pieces 65a' to 65c' to fix the projection section 57c of the rotor 57. Further, the terminal section 59 is provided, on its both end faces, with fixing pieces 66a and 66b to fix the device 56 to the chassis 31 or other casing.

Referring to FIG. 8, the relation between the switches 62a to 62d of the stator section 58 and the movable contact member pressure projections 61a to 61d of the rotor section 57 is described below. FIG. 8 shows a sectional view models of the movable contact member pressure projection 61a and the switch 62a.

Reference numeral 67 in the figure indicates an elastic piece to drive the movable contact member 62a'. It is formed from insulating material and is designed so that its head 67a can contact with the movable contact member pressure projection 61a and the bottom 67b is in contact with the movable contact member 62a'. When the movable contact member pressure projection 61a contacts with the head 67a of the elastic piece 67 and presses down the elastic piece 67 downward of the figure, the movable contact member 62a' is lowered and comes into contact with the fixed contact member 62a". A switch with such a structure is called a piano-touch type switch. For the switch contact members 62a' to 62d' and 62a" to 62d", silver or ordinary metal plates (brass, for example) plated with silver is used.

FIG. 8(a) shows a case where the movable contact member pressure projection 61a of the rotor section 57 is positioned not in contact with the elastic piece 67. In this status, the movable contact member 62a' is at a distance from the fixed contact member 62a" because of the hardness of its material and is not in contact with it, i.e. the switch 62a is in OFF status. When, from this status, the rotor section 57 moves from the right to the left as shown with an arrow in the figure and comes to the position as shown in FIG. 8(b), the movable contact member pressure projection 61a of the rotor section 57 rides onto the head 67a of the elastic piece 67 and presses the movable contact member 62a' downward in the figure so that it comes into contact with the fixed contact member 62a", i.e. the switch is turned on.

Further, when the rotor section 57 makes rotation and the movable contact member pressure projection 61a leaves the head 67a of the elastic piece 67, the movable contact member 62a' leaves the fixed contact member 62a" because of its own elasticity and goes back to the position in FIG. 8(a).

Thus, the rotation of the rotor section 57 in the device 56, together with the rotation of the detection gear 37, detects various operation modes from combination of ON and OFF among the switches 62a to 62d.

In order to detect the operation mode, the switch 62d of the device 56 is used as the common switch (grounding switch connected by the fixed contact member 62d" to the reference potential). In the cassette eject mode where the tape cassette is discharged from VTR and the magnetic tape driving mechanism is in the standby status waiting for loading of a tape cassette, the switches 62a to 62d of the device 56 are turned on and the connection terminals 64a to 64d are, for example, all set to the low level. Then, in the tape loading mode where the tape cassette is carried to the VTR and the magnetic tape is arranged to the cylinder 51 and the rotational axis of the capstan motor 52 of the VTR, the switch 62b and the switch 62d are turned on. Thus, by checking the combination of ON status of the common switch 62d and ON status of other switches 62a to 62c, operation modes including PLAY, STOP, FF(Fast Forwarding), REWIND and REC(Recording) modes are detected.

If, in the VTR provided with an apparatus to detect the operation mode, the VTR operation power is turned off without input of any new operation mode or timer recording is reserved after the tape cassette is put into the VTR and the tape loading mode is completed, some of the switches 62a to 62d in the device 56 are turned off. Until input of the next operation mode or arrival of the recording start time, the VTR continues to be in the standby status. When the standby status is kept long, the switch contact members in OFF status are exposed to the air and react with substances in the air, resulting in sulfurization or oxidation of the surface or dust contamination on the surface. When the VTR proceeds from this standby mode to the next operation mode and the switch in the OFF status is turned on, the above sulfurization, oxidation or dust causes noises. Such noises are supplied from the contact terminals 64a to 64d to the control circuit 70 and lead to erroneous operation in operation mode detection or control of proceeding to the next operation mode.

SUMMARY OF THE INVENTION

It is an object of the present invention to provide an operation mode detection device of the magnetic recording and reproducing apparatus which prevents noise generation which may cause errors in the operation mode detection and control by removing sulfurization or oxidation or dust contamination on the switch contact members in the device when the device having the piano-touch type switch structure is used for operation mode detection of the VTR without affecting the operation mode judgement of the VTR.

The operation mode detection device according to the present invention is, when operation mode setting means to set a plurality of operation modes of the apparatus by driving the mechanical members arranges any driving situation, driven for rotations corresponding to such driving situation of the mechanical members and electrically detects the set driving mode.

In a first invention, the above device comprises a stator section having a fixed contact member for common terminal and a plurality of fixed contact members for detection terminals, as well as a movable contact member for common terminal and a plurality of movable contact members for detection terminals laid out oppositely to the fixed contact members and usually positioned in a distance from the fixed contact members, and a rotor section provided with a plurality of movale contact member pressure projections which are driven for rotation corresponding to the driving situation of the mechanical members and selectively come into contact with the movable contact member for common terminal and at least one of the movable contact members for detection terminals at the same time corresponding to the rotational position and cause such movable contact members to come into contact with the fixed contact member to output the electric signal showing the operation mode, and a dummy on projection which comes into contact with the movable contact member for common terminal alone or with the movable contact member for detection terminal alone corresponding to the rotational position so that the applicable movable contact member comes into contact with the fixed contact member.

In a second invention, the above dummy on projection is provided at a position where the magnetic recording and reproducing apparatus is in the way of proceeding from the operation standby status to other operation mode.

Further, in a third invention, the above dummy on projection is positioned between the position corresponding to the operation standby status of the magnetic recording and reproducing apparatus and the position corresponding to the first operation mode laid out next to the operation standby status.

In a fourth invention, the above device is designed so that, when the magnetic recording and reproducing apparatus is set to an operation mode other than the first operation mode from the operation standby status, the rotor section rotates, via the position corresponding to the first operation mode, to the position corresponding to the applicable operation mode.

Still in a fifth invention, when the movable contact member for detection terminal and the fixed contact member for detection terminal are continuously in contact for a certain rotational angle, the movale contact member pressure projection which causes the movable contact member for detection terminal to come into contact with the fixed contact member for detection terminal is provided with a dummy off part to cancel contact between the movable contact member for detection terminal and the fixed contact member for detection terminal while the movable contact member for common terminal is not in contact with the fixed contact member for common terminal.

BRIEF DESCRIPTION OF THE INVENTION

FIGS. 1(a) to 1(e) are switch operation development diagram for every operation mode illustrating an embodiment of the operation mode detection device in the magnetic recording and reproducing apparatus according to the present invention;

Figure 6A:
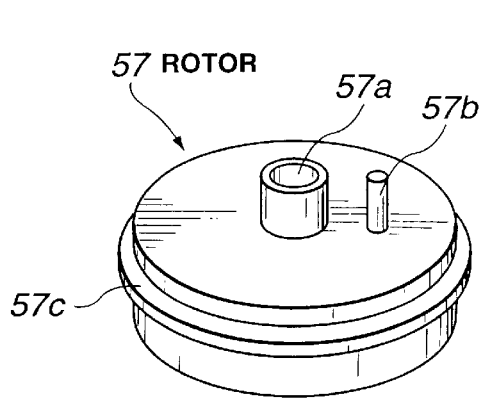
Figure 6B:
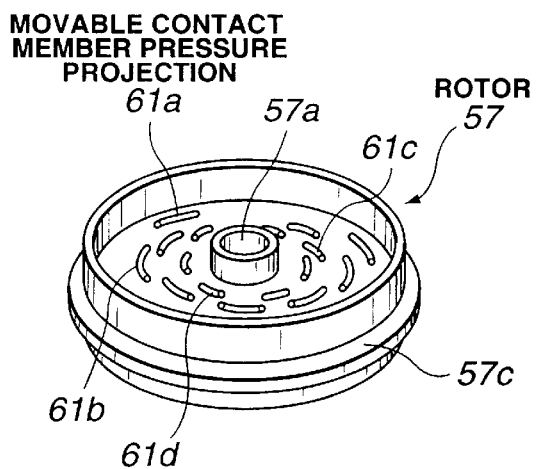
Figure 6C:
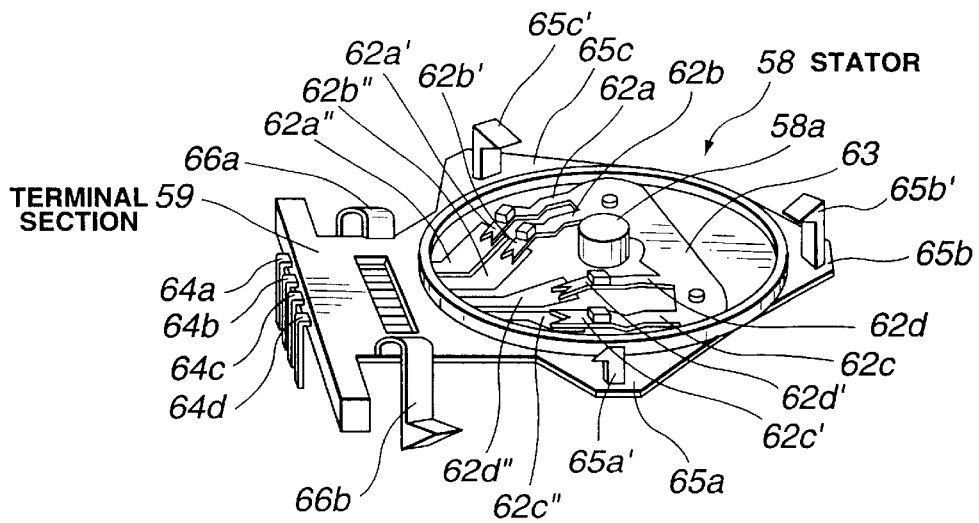

FIGS. 6(a) to 6(c) are developed perspective views of a device used in the conventional magnetic recording and reproducing apparatus;

FIG. 7 is a circuit diagram for FIGS. 6(a) to 6(c); and

Figure 8A:
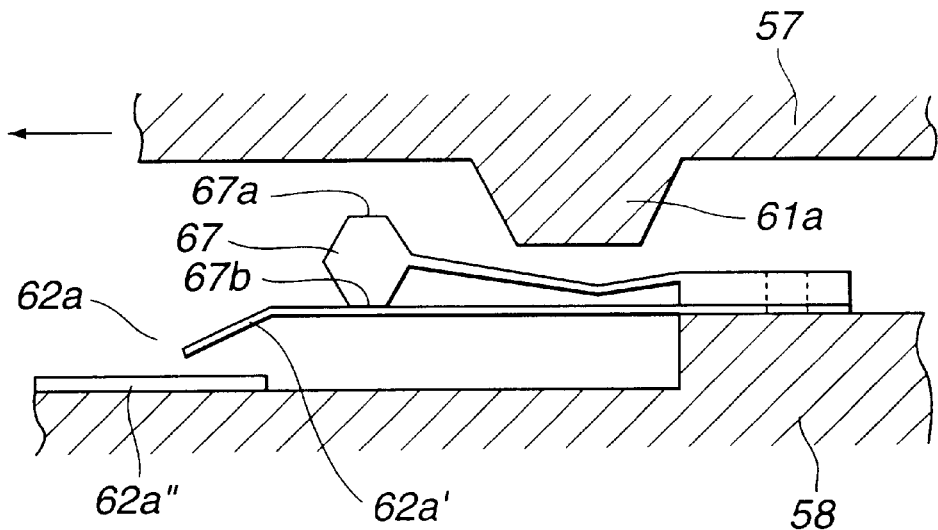
Figure 8B:
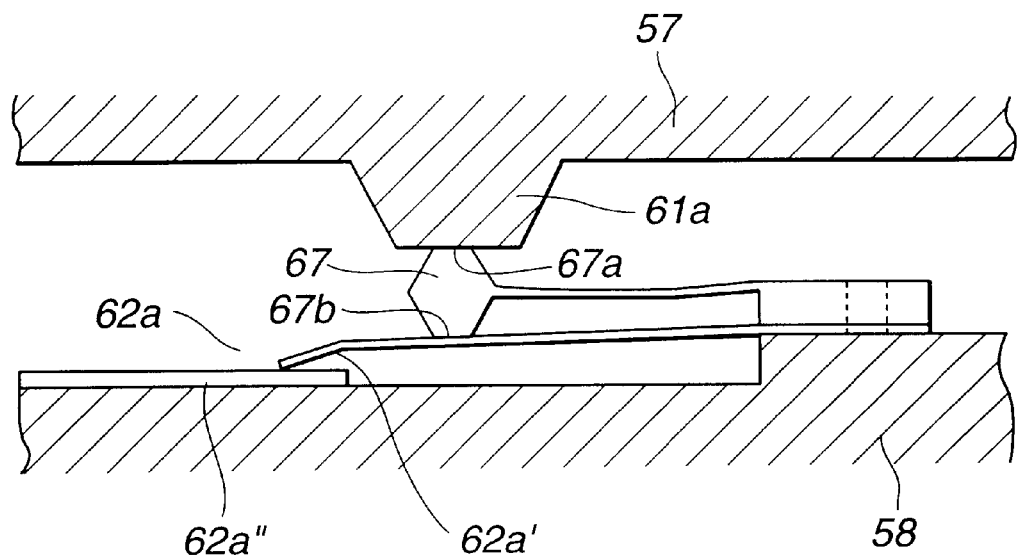

FIGS. 8(a) and 8(b) are sectional views to explain operation of the device as shown in FIGS. 6(a) to 6(c).

DETAILED DESCRIPTION OF THE PREFERRED EMBODIMENTS

Figure 1:
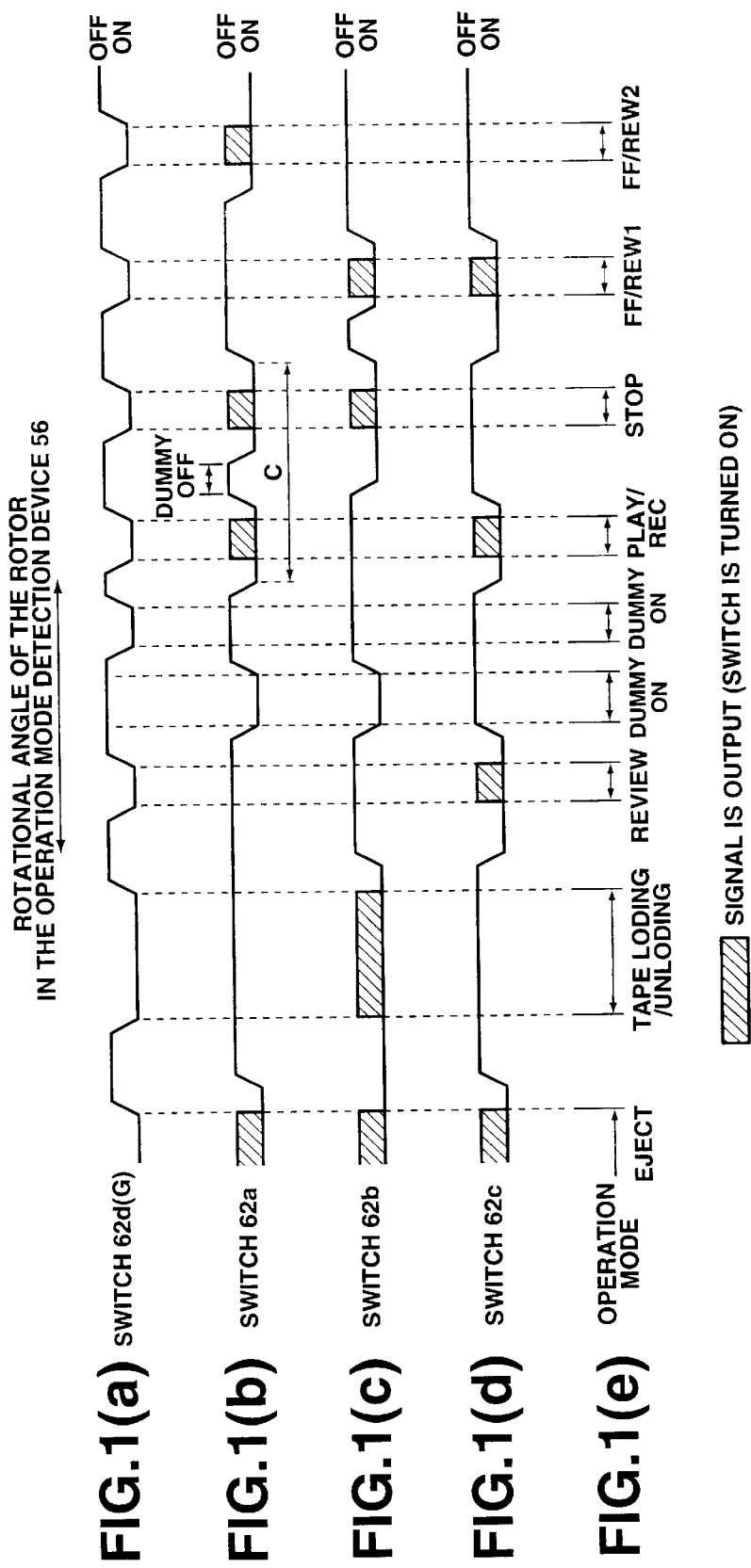

Referring to the attached figures, preferred embodiments of the present invention will be described in details below. FIG. 1 is a switch operation development diagram for every operation mode illustrating an embodiment of the operation mode detection device in the magnetic recording and reproducing apparatus according to the present invention. Note that the operation mode detection device of the VTR according to the present invention is, similarly to the conventional one, laid out onto the detection gear 37, which causes sliding of the slider 38 constituting the magnetic tape driving mechanism by driving the electric motor 32 and is provided with a piano-touch type movable contact members.

The ON/OFF operation of the device 56 for every operation mode of the VTR according to the present invention is made in the same way as that shown in FIGS. 6(a) to 6(c): the switches 62a to 62d are turned on by the arranged positions of the movable contact member pressure projections 61a to 61d of the rotor section 57. FIG. 1 shows the operation statuses corresponding to the positions of the movable contact member pressure projections 61a to 61d laid out for every rotational angle of the rotor section 57 and the switches 62a to 62d of the stator section 58 are turned on and off according to the positions where the movable contact member pressure projections 61a to 61d are laid out.

FIG. 1(a) shows the ON/OFF status of the switch 62d, FIG. 1(b) shows the ON/OFF status of the switch 62a, FIG. 1(c) shows the ON/OFF status of the switch 62b, FIG. 1(d) shows the ON/OFF status of the switch 62c and FIG. 1(e) shows the operation mode determined by combination of ON statuses of the switch 62d and switches 62a to 62c.

The switch 62d shows a common switch (grounding switch with the fixed contact member 62d" in contact with the referential potential point such as chassis 31). From the combination of ON statuses of the common switch 62d and other switches 62a to 62c, operation modes such as PLAY, STOP, FF(Fast Forwarding), REW(Rewind) and REC (Recording) can be detected.

In the cassette eject mode without any tape cassette in the VTR, the switches 62a to 62d are turned on by the movable contact member pressure projections 61a to 61d. Then, in the tape loading mode where a tape cassette is put into the VTR and the magnetic tape is arranged onto the cylinder 51 and the rotational axis of the capstan motor 52 of the VTR, the movable contact member pressure projections 61b and 61d turn on the switches 62b and 62d. Similarly, as shown in the figure, the rotor section 57 is provided, for each of its rotation angles, with the movable contact member pressure projections 61a to 61d so that the switches 62a to 62c other than the common switch 62d are turned on and off differently for different modes: REVIEW, PLAY, REC, STOP and FF/REW. Note that the magnetic recording and reproducing apparatus according to this embodiment is designed so that soft braking is applied to the reel base on the tape feeding side. In FIG. 1(e), FF/REW1 and FF/REW2 show that two positions (or two modes) are required because the soft braking is applied to different reel bases corresponding to the winding direction.

The VTR waits in the standby status for the longest time in the cassette eject mode without any tape cassette in the VTR. In this mode, the switches 62a to 62d of the device 56 are set so that they are all turned on as shown in FIG. 1. Here, the movable contact member 62a' to 62d' and the fixed contact members 62a" to 62d" of the switches 62a to 62d are in contact and the switch contact members are not sulfurized or oxidized or contaminated with dust. However, if the VTR is left in the status with a tape cassette in the VTR and the magnetic tape arranged onto the certain tape running mechanism (including the cylinder and the rotational axis of the capstan) in the tape loading mode without input of the next operation mode or if the recording mode is reserved with the timer, one to two switches among the switches 62a to 62d of the device 56 are left in the OFF status or the standby status until the input of the next operation mode. During such standby period, the switch contact members are sulfurized or oxidized or contaminated with dust.

On the other hand, suppose execution of any operation mode after tape loading with a tape cassette put into the VTR. The mechanical system takes the PLAY/REC mode position, which is the same status as that when the VTR makes reproducing and recording operations, as the reference position. The system is designed so that, from the PLAY/REC mode position, it once proceeds to the REVIEW mode, which is the first operation mode, and then goes to other operation mode. In other words, the mechanical PLAY/REC mode position is used as the standby position and the system is arranged so that it proceeds from that position, via the first operation mode position, to other operation modes. Specifically, the rotor section 57 of the device 56 once makes rotation in a certain direction from the PLAY/REC mode position to go back to the REVIEW mode and then makes rotation in the reverse direction to go to the STOP, FF/REW or other operation mode. Thus, in the standby status above where the VTR is in the PLAY/REC mode (i.e. the mechanism is in the same status as the PLAY/REC mode but any playing or recording operation is not executed electrically), the switch 62*b* of the device 56 is left in the OFF status for a long time and the contact member of the switch 62*b* may be sulfurized or oxidized or contaminated with dust.

Figure 2:
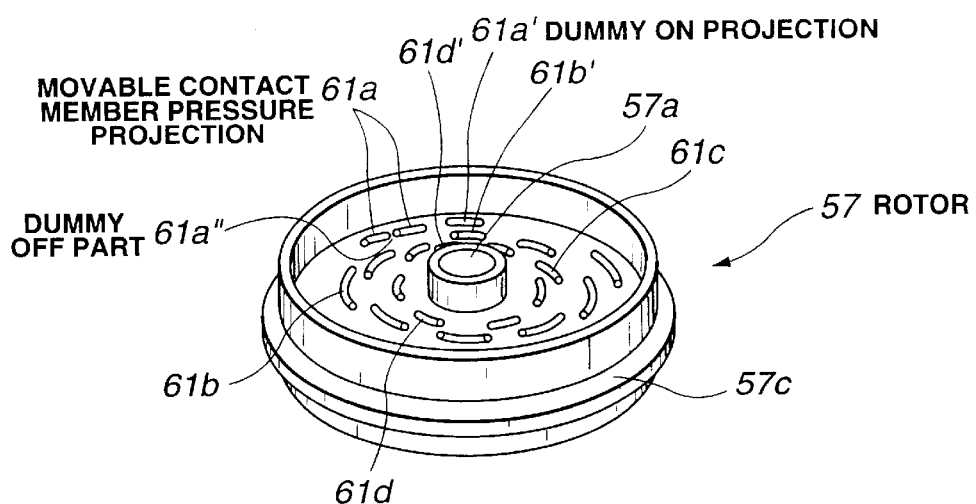
FIG. 2 is a conceptual schematic diagram illustrating roughly the constitution of the back (inside) of the rotor section of the device in FIG. 1.

In this embodiment, a new mode to turn on the switches 62*a*, 62*b* and 62*d* of the device 56 as dummies (hereinafter called "dummy on") is provided between the PLAY/REC mode and the REVIEW mode, for example. As shown in FIG. 2, dummy on projections 61*a'*, 61*b'* and 61*d'* for this dummy on mode are provided between the PLAY/REC mode position and the REVIEW mode position of the rotation angle on the rotor section 57. The dummy on projections 61*a'*, 61*b'* and 61*d'* shown in FIG. 2 are provided in addition to the movable contact member pressure projections 61*a*, 61*b* and 61*d* as shown in FIG. 6(*b*). Note that FIG. 2 just shows the outline of this embodiment in comparison with the schematic configuration of FIG. 6(*b*) and does not show the exact switch structure. The operation mode timings corresponding to the exact switch structure are shown in FIG. 1. The VTR is designed so that, when any operation mode is set, it leaves the standby status, goes to the dummy on mode and REVIEW mode positions and then proceeds to the set mode. For this operation, as the REVIEW mode is not set as the VTR operation mode, the VTR does not stop at the REVIEW mode position.

In other words, the device waits in the PLAY/REC mode status and, when the next operation mode is instructed, it proceeds, from the standby status, to the dummy mode and the review mode and then to the operation mode as input. During this procedure, the switches 62*a* and 62*b* of the device 56 only are turned on and then the switch 62*d* only is turned on (dummy on mode). Sulfurization or oxidation or dust contamination generated on the switches 62*a*, 62*b* and 62*d* are removed in this mode. Since the switch 62*d* is not turned on at the timing when the switches 62*a* and 62*b* are turned on, and the switches 62*a* to 62*c* are not turned on at the timing when the switch 62*d* is turned on, any operation mode signal is not supplied to the control circuit 70 connected to the connection terminals 64*a* to 64*d* and the switch contact member cleaning only is executed.

Though dummy on operation of the switch 62*c* has not been described, it is easily possible to provide a dummy on projection 61*c'* in addition to the movable contact member pressure projection 61*c* in FIG. 6(*b*) and thereby cause dummy on status as in the case of other switches 62*a*, 62*b* and 62*d*.

Then, referring to FIG. 3, removal of sulfurization or oxidation or dust contamination on the switch contact members by the ON operation of the switch 62*b* in the dummy on mode will be described below. The same reference numerals are given to the same parts shown in FIGS. 6 to 8. The applicable section in the switch 62*b* of the device 56 is used for explanation.

Figure 3:
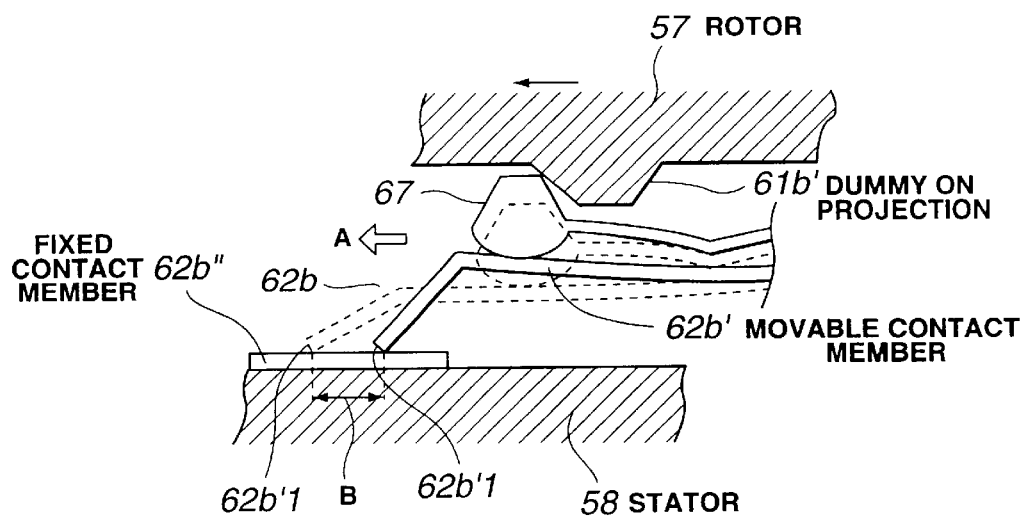
FIG. 3 is a sectional view of a switch contact member of a device used in the present invention.
Figure 4:
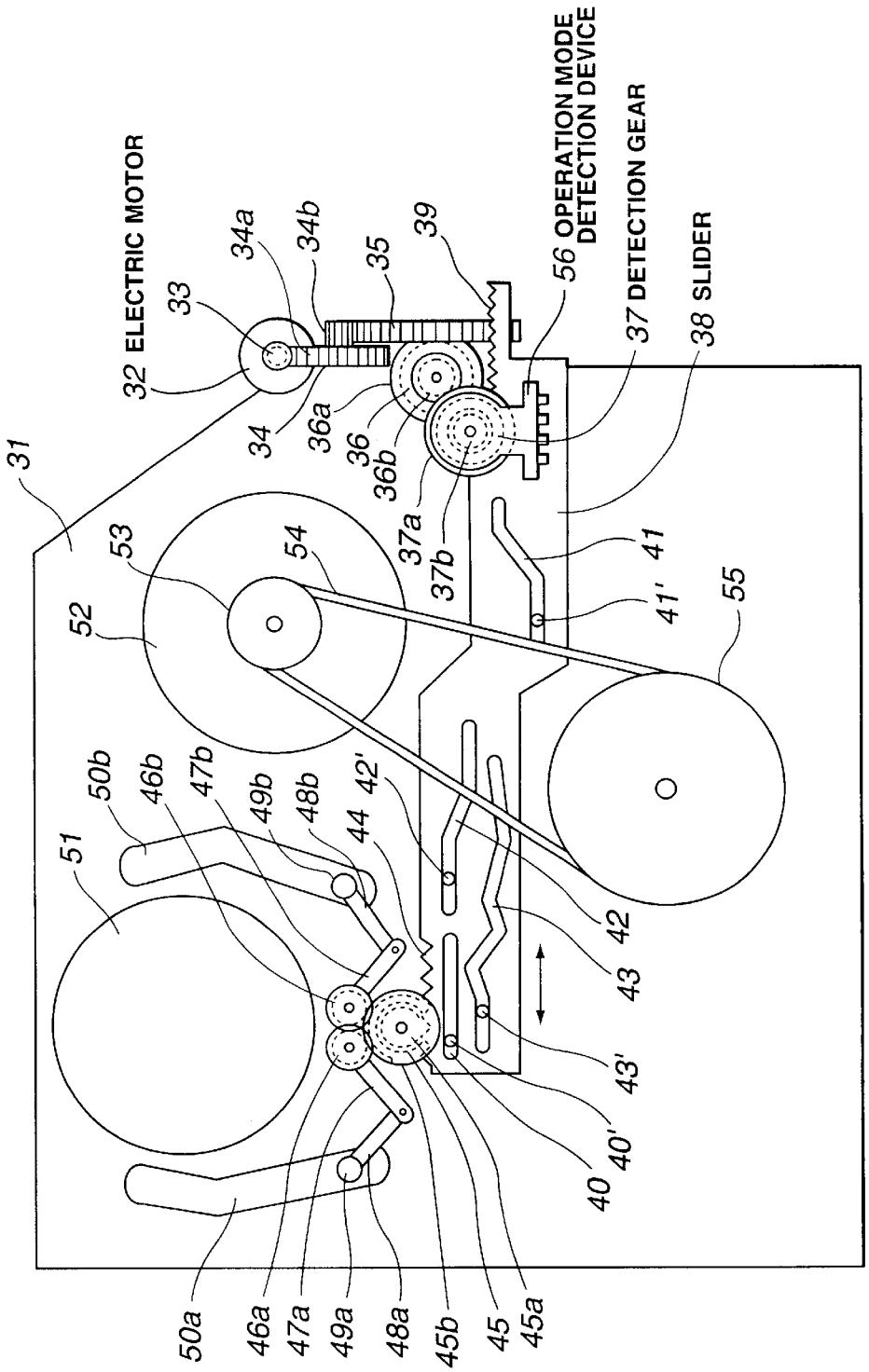
FIG. 4 is a plan view showing the magnetic tape driving mechanism of the conventional magnetic recording and reproducing apparatus.
Figure 5:
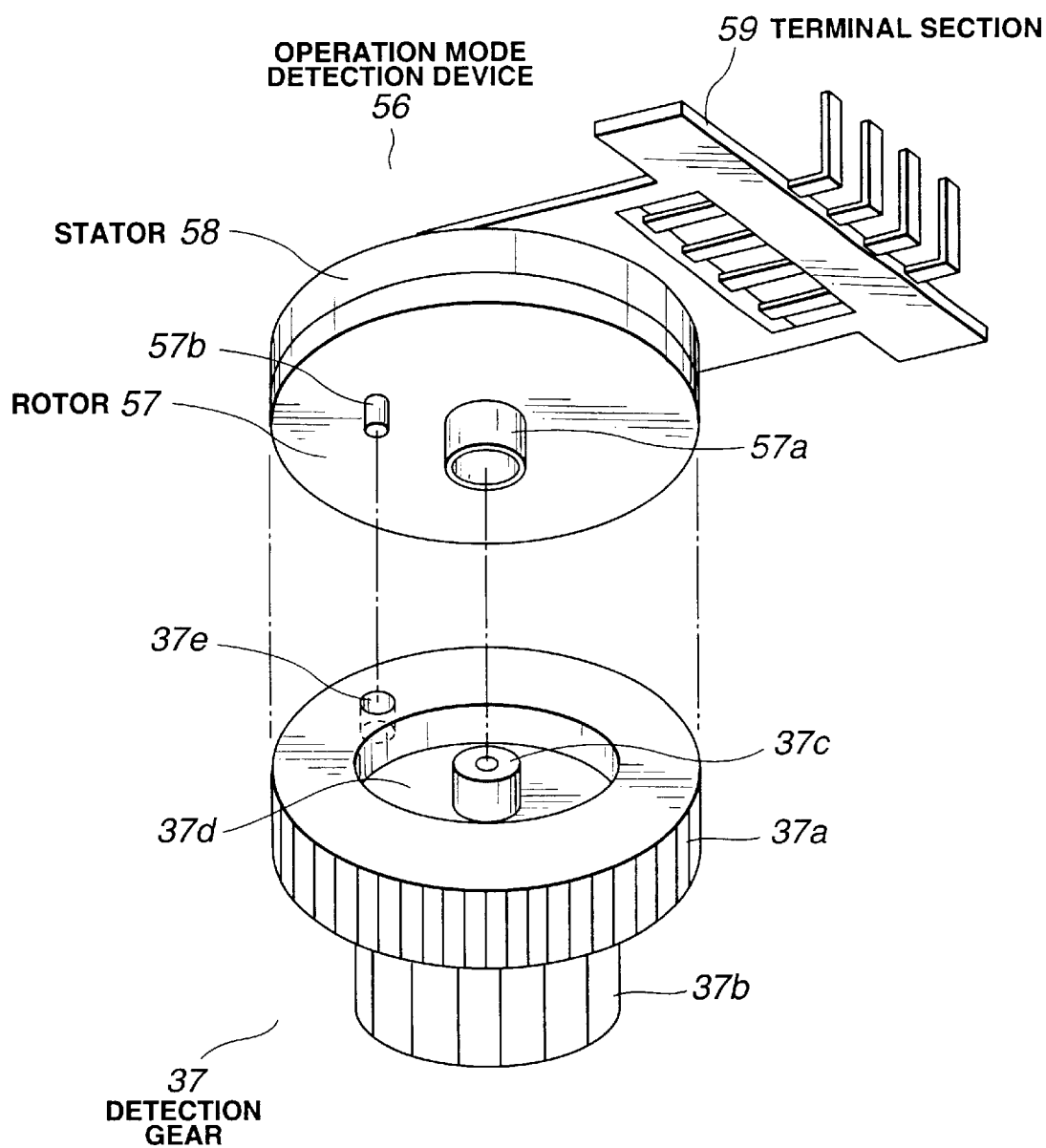
FIG. 5 is a perspective view of a detection gear and a device used in the conventional magnetic recording and reproducing apparatus.

The movable contact member 62*b'* in the switch 62*b* of the device 56 is gradually pressed via the elastic piece 67 by rotation of the dummy on projection 61*b'* of the rotor section 57 and the end of the movable contact member 62*b'* slides on the surface of the fixed contact member 62*b"* to the position shown with broken line in FIG. 3 in the direction of arrow A. In other words, the end 62*b'* of the movable contact member 62*b'* makes sliding with being in contact with the surface of the fixed contact member 62*b"* for area B as shown in FIG. 3. By the sliding friction between the end 62*b'* of the movable contact member 62*b'* and the surface of the fixed contact member 62*b"*, sulfurization or oxidation or dust on the switch contact member can be removed.

After removal of sulfurization or oxidation or dust on the switch contact members in this dummy mode, turning on of the switch 62*b* in other operation mode does not cause any noise generation because sulfurization or oxidation or dust has been already removed.

To sum up, according to this embodiment of the present invention, the switch structure of the piano-touch type switch for operation mode detection is installed in the magnetic tape driving mechanism to drive and control the VTR operation mode, and is provided with the dummy on projections formed at the movable contact member pressure projections to turn on and off a plurality of switches in the above piano-touch type switch by rotations linked with the magnetic tape driving mechanism. Upon input of a new operation mode after a long standby status with a tape cassette put in and loaded to the VTR, the dummy on projections once turn on the switches to clean the switch contact members by sliding friction.

If, as shown in FIG. 1, there exists a relatively long period C in which a switch is continuously turned on while the rotor section 57 makes a rotation for a certain angle such as the period between the PLAY/REC mode and the STOP mode for the switch 62*a*, the VTR may be designed so that it goes off (dummy off) while the common switch 62*d* is not turned on during that period and then it comes on again. Thus, the contact members are cleaned to improve the electric contact status. To once turn off the VTR (dummy off), a part of the movable contact member pressure projection 61*a* may be cut (deleted) (i.e. a dummy off part 61*a"* is formed in the configuration as shown in FIG. 2).

Though the dummy on position has been arranged between the standby PLAY/REC mode and the REVIEW mode in the above description, it is acceptable to have "dummy on" at other positions. Further, proceeding from the standby status to other operation mode has been described to be made via the dummy on position and the REVIEW mode position before going to the applicable operation mode, but the dummy on position may be provided at all positions where it is possible to have such dummy on mode. Specifically, within the rotation range of the rotor section 57 of the device 56, dummy on projections may be provided at all rotational positions (periods) where the switch 62*d* alone goes off or at all rotational positions (periods) where the switch 62*d* alone is turned on, for example. In such case, the VTR can directly goes from the standby status to the selected operation mode without going through the REVIEW mode as described in FIG. 1 after leaving the standby status in the PLAY/REC mode. This is because the dummy on position can be also set between the standby status and the operation mode to which the VTR is directly proceeding.

As described above, according to the present invention, an operation mode detection device free from any erroneous judgment of the operation mode or erroneous control can be provided. Before input of any operation mode, the VTR has a tape cassette put in and loaded to it and is in the standby status. Upon input of a new operation mode, the switch contact members of the switches to detect the operation mode are set to the dummy on status and are cleaned so that noise generation during ON/OFF operations of the switch can be prevented in advance and the switch ON/OFF status can be exactly detected.

It is naturally understood that the present invention is not limited to the embodiment as described above. It can be modified in various ways without departing from the spirit of the invention.

What is claimed is:

1. An operation mode detection device of a magnetic recording and reproducing apparatus driven for rotations corresponding to the driving situation of mechanical members of said magnetic recording and reproducing apparatus arranged by operation mode setting means which sets a plurality of operation modes of said magnetic recording and reproducing apparatus by driving said mechanical members so that it can electrically detect the set driving mode;

said device comprising:
   a stator section having a fixed contact member for common terminal and a plurality of fixed contact members for detection terminals, a movable contact member for common terminal and a plurality of movable contact members for detection terminals laid out oppositely to the fixed contact members and prodically positioned at a distance from the fixed contact members, and
   a rotor section provided with a plurality of movable contact member pressure projections which are driven for rotation corresponding to the driving situation of said mechanical members and which selectively come into contact with said movable contact member for common terminal and at least one of the movable contact members for detection terminals at the same time corresponding to the rotational position and cause such movable contact members to come into contact with said fixed contact members to output the electric signal showing said operation mode, and a dummy on projection which comes into contact with said movable contact member for common terminal alone or with said movable contact member for detection terminal alone corresponding to the rotational position so that said applicable movable contact member comes into contact with said fixed contact member.

2. An operation mode detection device of the magnetic recording and reproducing apparatus according to claim 1, wherein said dummy on projection is provided at a position where the magnetic recording and reproducing apparatus is in the way of proceeding from the operation standby status to other operation mode.

3. An operation mode detection device of the magnetic recording and reproducing apparatus according to claim 1, wherein said dummy on projection is positioned between the position corresponding to the operation standby status of the magnetic recording and reproducing apparatus and the position corresponding to the first operation mode laid out next to the operation standby status.

4. An operation mode detection device of the magnetic recording and reproducing apparatus according to claim 3, wherein said device is designed so that, when said magnetic recording and reproducing apparatus is set to an operation mode other than said first operation mode from the operation standby status, said rotor section rotates, via the position corresponding to said first operation mode, to the position corresponding to the applicable operation mode.

5. An operation mode detection device of a magnetic recording and reproducing apparatus driven for rotations corresponding to the driving situation of mechanical members of said magnetic recording and reproducing apparatus arranged by operation mode setting means which sets a plurality of operation modes of said magnetic recording and reproducing apparatus by driving said mechanical members so that it can electrically detect the set driving mode;

said device comprising:
   a stator section having a fixed contact member for common terminal and a plurality of fixed contact members for detection terminals, a movable contact member for common terminal and a plurality of movable contact members for detection terminals laid out oppositely to the fixed contact members and periodically positioned at a distance from the fixed contact members, and
   a rotor section provided with a plurality of movable contact member pressure projections which are driven for rotation corresponding to the driving situation of said mechanical members and selectively come into contact with said movable contact member for common terminal and at least one of the movable contact members for detection terminals at the same time corresponding to the rotational position and cause such movable contact members to come into contact with said fixed contact member to output the electric signal showing said operation mode, and a dummy off part which cancels contact between said movable contact member for detection terminal and said fixed contact member for detection terminal, when said movable contact member for common terminal is not in contact with the fixed contact member for common terminal, at the movable contact member pressure projection which causes said movable contact member for detection terminal to come into contact with the fixed contact member for detection terminal when said movable contact member for detection terminal and said fixed contact member for detection terminal are continuously in contact for a certain rotational angle.

* * * * *